INVENTOR
Ben Wade Oakes Dickinson, III
BY
Attorneys

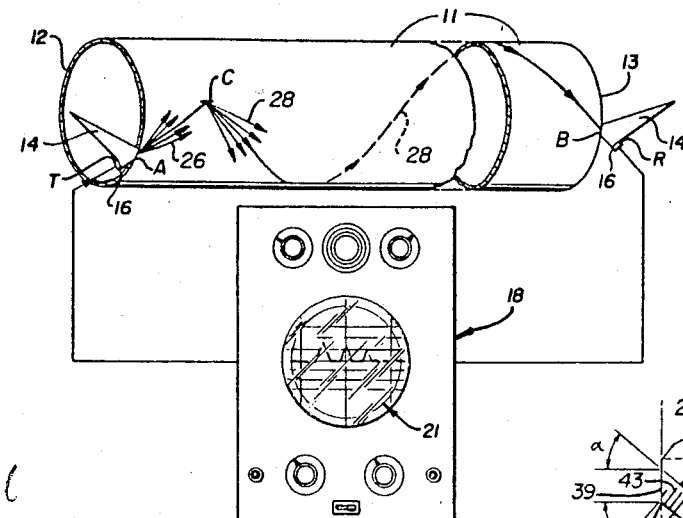
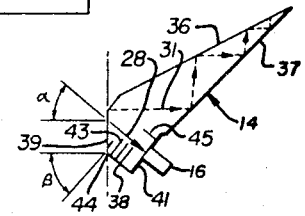
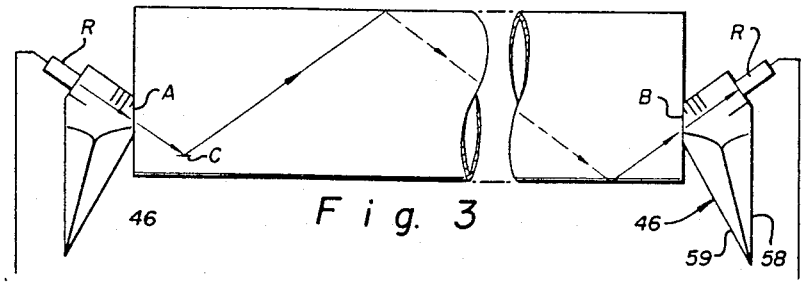
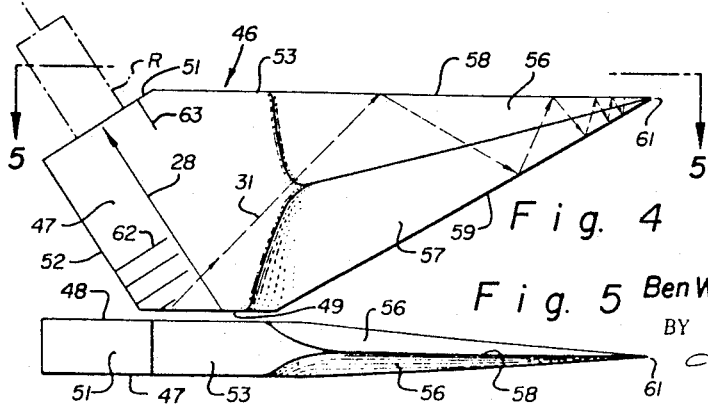
Fig. 1  Fig. 2  Fig. 3  Fig. 4  Fig. 5
INVENTOR.
Ben Wade Oakes Dickinson III
Attorneys

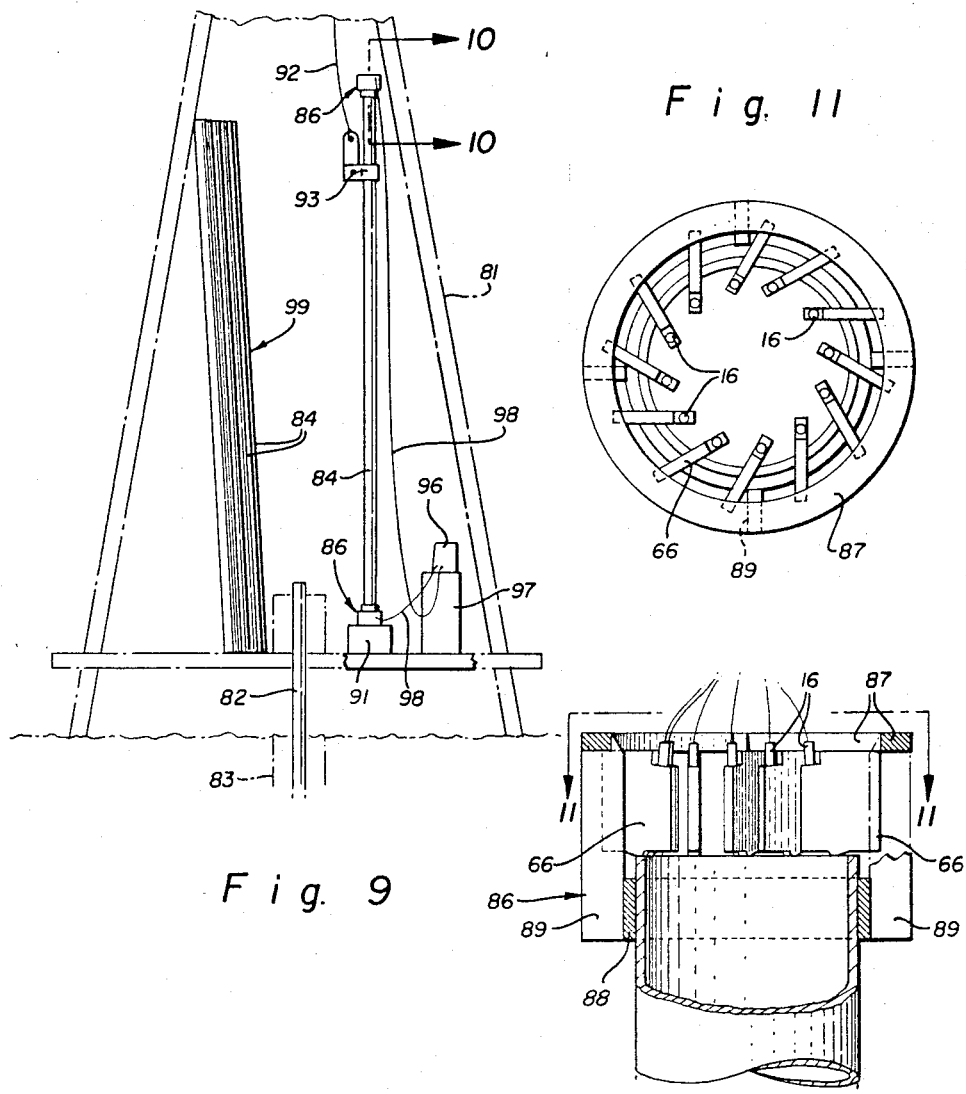

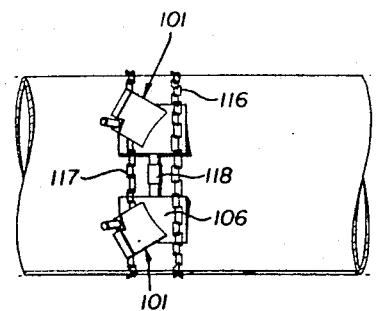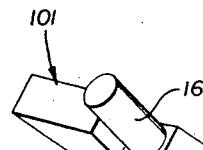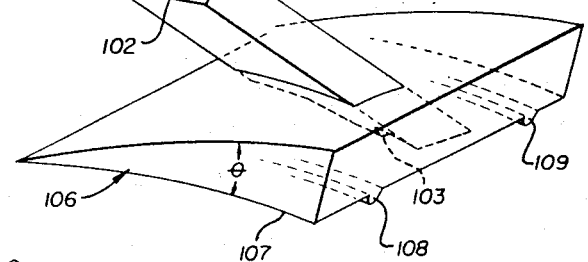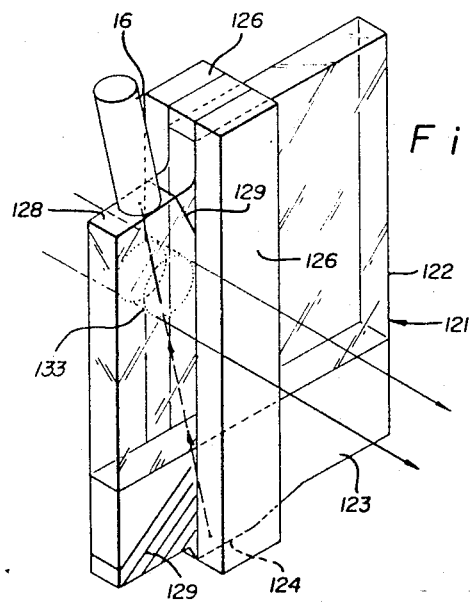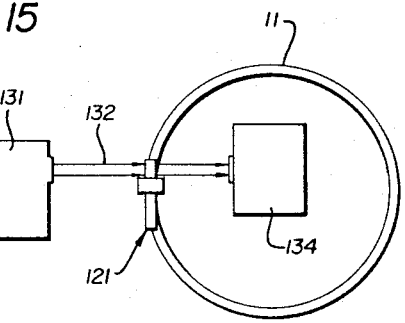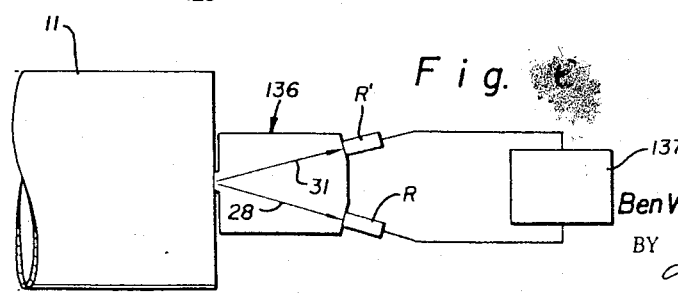

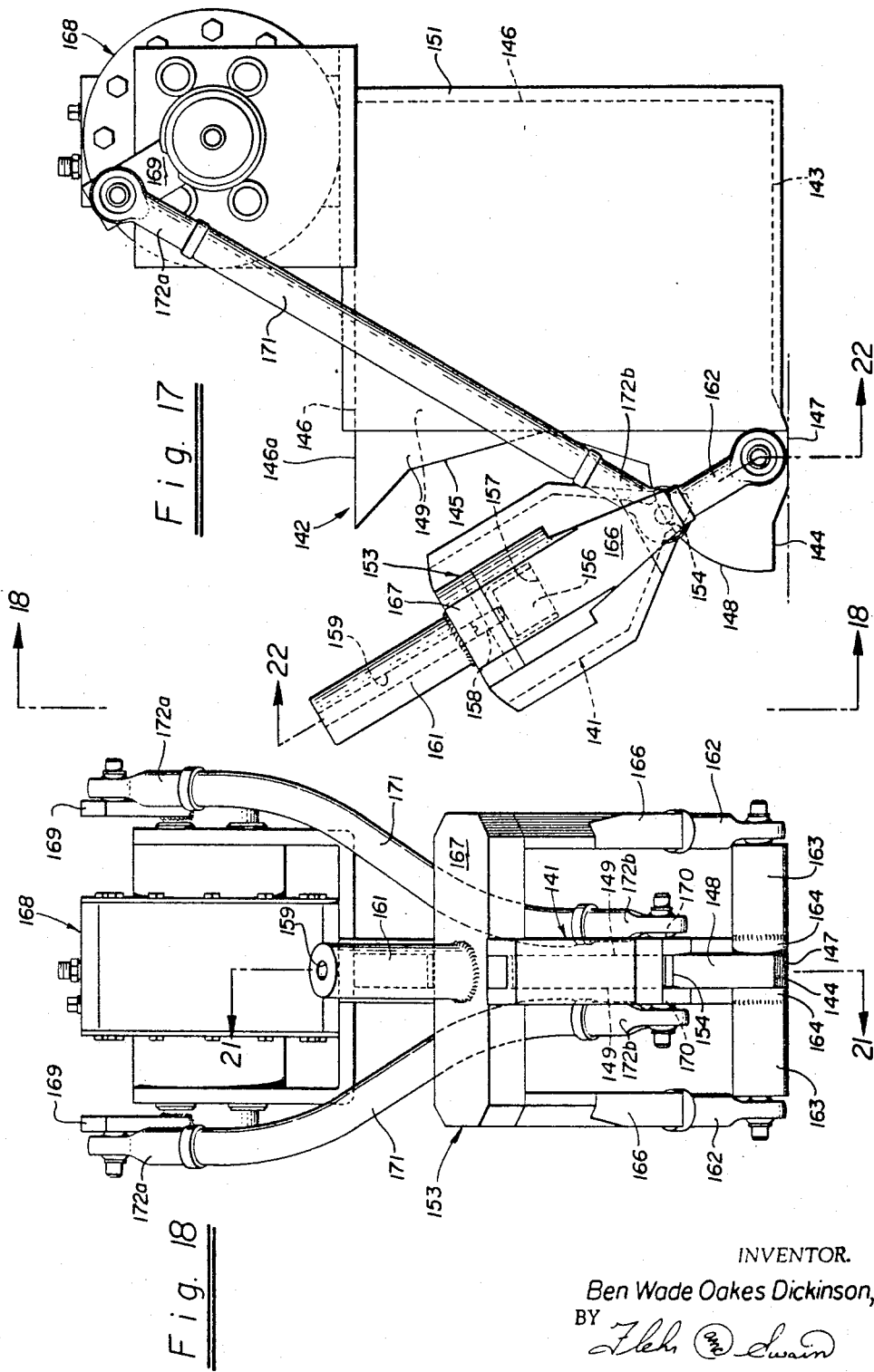

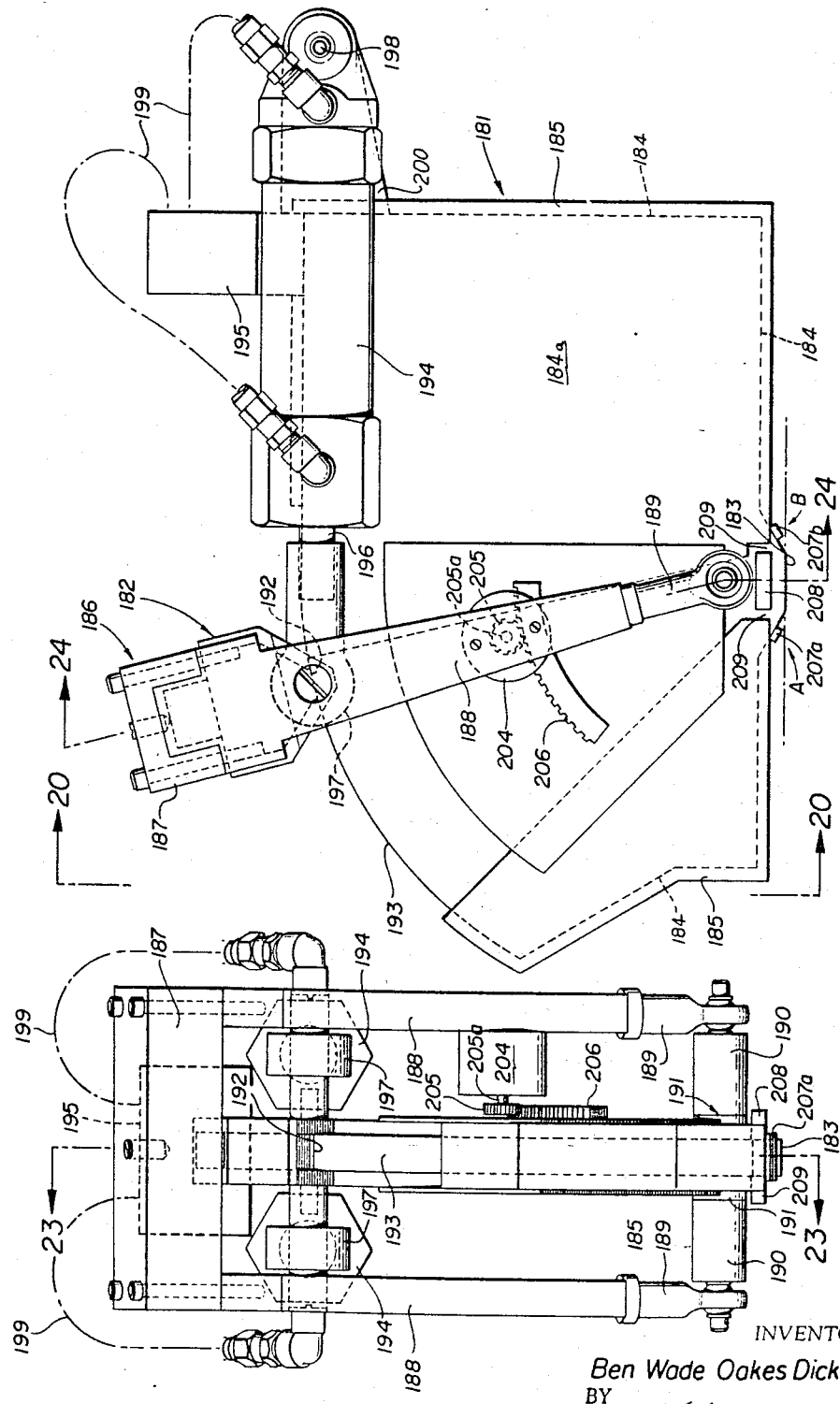

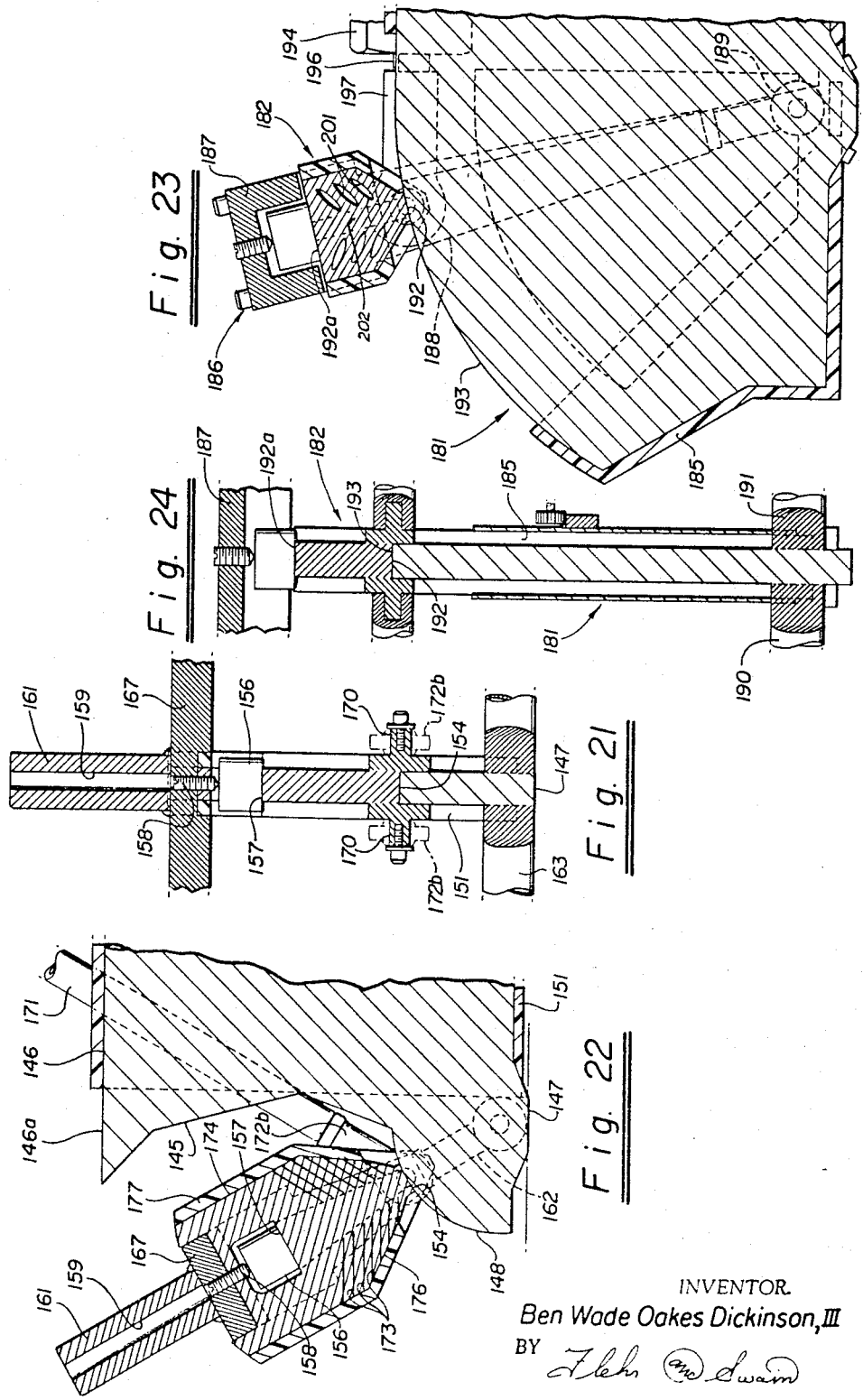

United States Patent Office 3,299,696
Patented Jan. 24, 1967

3,299,696
APPARATUS FOR GENERATING, DIRECTING AND RECEIVING ULTRASONIC WAVE TRAINS
Ben Wade Oakes Dickinson III, 3290 Jackson St., San Francisco, Calif. 94118
Filed Apr. 5, 1965, Ser. No. 445,503
27 Claims. (Cl. 73—71.5)

This application is a continuation-in-part of application Serial No. 268,204, filed March 26, 1963 which is a continuation in-part of Serial No. 151,331, filed November 9, 1961, now Patent No. 3,186,216.

This invention relates to apparatus for generating and receiving ultrasonic waves and in particular to wave directors utilized in such apparatus.

In order to introduce ultrasonic wave trains from a transducer into the wall of a tubular member at an angle differing substantially from the longitudinal axis of the tubular member so that the introduced wave will travel in a helical path and to introduce an ultrasonic wave train from a transducer into the wall of a member at an angle differing substantially from the normal to the surface at which the wave is introduced, it is necessary to utilize wave directors or off-sets which preclude and control undesirable diffraction effects. Wave directors or off-sets of the same or similar type, are also used for receiving the introduced ultrasonic wave trains at other, spaced-apart surfaces of the member being tested. Such wave directors or off-sets, heretofore have not been available.

In general, it is an object of the present invention to provide apparatus for generating and receiving ultrasonic wave trains of a controlled orientation with respect to the member to be tested and which makes use of wave directors or off-sets.

Another object of the invention is to provide apparatus of the above character in which the angle of the introduced waves with respect to the surface at which they are introduced, can be very precisely controlled.

Another object of the invention is to provide apparatus of the above character which is particularly adapted for testing under "go" or "no-go" operation.

Another object of the invention is to provide apparatus of the above character in which any spurious mode-converted waves are eliminated.

Another object of the invention is to provide apparatus of the above character in which the received waves can be identified automatically.

Another object of the invention is to provide an apparatus of the above character which can be readily attached to the object to be tested.

Another object of the invention is to provide wave directors and attenuators of the above character which improve the ratio of the signal deflected from the flaw to the undeflected signal.

Another object of the invention is to provide wave directors and attenuators of the above character which substantially increase the amount of bouncing or internal scattering of the undesired waves to improve the signal to noise ratio of the deflected or bounced wave (signal) with respect to the undeflected or unbounced wave (noise).

Another object of the invention is to provide wave directors and attenuators of the above character which can be readily placed in intimate contact with the object to be tested.

Another object of the invention is to provide wave directors and attenuators of the above character in which it is possible to determine the location of the wave in the director and attenuator as it passes through the director and attenuator.

Another object of the invention is to provide wave directors and attenuators of the above character in which the location of the wave passing through the director can be determined non-destructively.

Another object of the invention is to provide wave directors and attenuators of the above character which preferentially attenuate certain modes or transverse components of generated or received waves to effect selective polarization.

Another object of the invention is to provide wave directors and attenuators of the above character in which undesirable diffracted signals are minimized, attenuated and controlled within the wave directors and attenuators.

Another object of the invention is to provide wave directors and attenuators of the above character in which the angular width of the ultrasonic wave trains is collimated and controlled by acoustical focusing.

Another object of the invention is to provide wave directors and attenuators of the above character in which heating and cooling is utilized in certain portions of the wave director to minimize and control undesirable diffracted signals.

Another object of the invention is to provide wave directors and attenuators of the above character in which the angle of transmission and reception of ultrasonic waves in a plane can be continuously varied.

Another object of the invention is to provide an ultrasonic wave director construction of the above character which provide that selected ultrasonic wave trains are transmitted or received, the selection being continuously adjustable to any desired angle within a predetermined range.

Another object of the invention is to provide an ultrasonic wave director of the above character in which the selected angle lies in a range generally defined by a solid angle.

Another object of the invention is to provide wave directors and attenuators of the above character in which several mechanisms and hydraulic means are provided in certain portions of the wave director for automatically setting the scanning direction.

Additional objects and features of the invention will appear from the following description in which the preferred embodiments are set forth in detail in conjunction with the accompanying drawing.

Referring to the drawings:

FIGURE 1 is a front elevational view with certain parts schematically illustrated of apparatus incorporating my invention;

FIGURE 2 is an enlarged detail view of the wave directors and off-sets utilized in the apparatus shown in FIGURE 1;

FIGURE 3 is a front elevational view with certain parts schematically illustrated of another apparatus incorporating my invention;

FIGURE 4 is an enlarged side elevational view of the wave director and attenuator utilized in FIGURE 3;

FIGURE 5 is a top plan view of the wave director and attenuator shown in FIGURE 4;

FIGURE 9 is a schematic view of an embodiment of my apparatus particularly adapted for testing of drill pipe;

FIGURE 10 is an enlarged view taken along the line 10—10 of FIGURE 9;

FIGURE 11 is a view taken along the line 11—11 of FIGURE 10;

FIGURE 12 is a top plan view of another embodiment of apparatus incorporating my invention;

FIGURE 13 is an enlarged isometric view of the wave director and attenuator and wedge utilized for supporting the wave directors and attenuator which are used in FIGURE 12;

FIGURE 14 is an end elevational view of still another embodiment of my apparatus incorporating my invention;

FIGURE 15 is an enlarged isometric view of the wave director and attenuator utilized in FIGURE 14;

FIGURE 16 is a front elevational view showing still another embodiment of a wave director and attenuator incorporating my invention;

FIGURE 17 is a side elevation view showing another embodiment incorporating my invention and showing particularly means for adjusting the angle of transmission;

FIGURE 18 is a front elevational view of the wave director and the attenuator shown in FIGURE 17;

FIGURE 19 is a side elevational view showing another embodiment of a wave director and attenuator incorporating my invention;

FIGURE 20 is a front elevational view of the wave director and attenuator shown in FIGURE 19;

FIGURE 21 is a side cross section view of the wave director and attenuator shown in FIGURE 17, taken along the lines 21—21 of FIGURE 18;

FIGURE 22 is a cross section view taken along the line 22—22 of FIGURE 17;

FIGURE 23 is a cross section view taken along the lines 23—23 of FIGURE 20;

FIGURE 24 is a cross sectional view of the wave director attenuator taken along the lines 24—24 of FIGURE 19;

Figure 6:
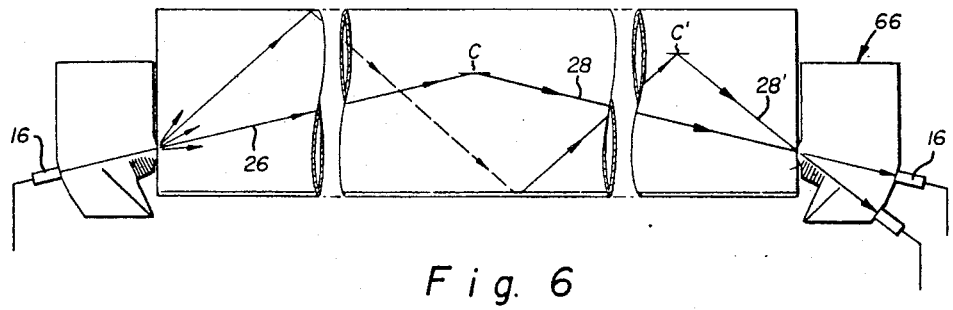
FIGURE 6 is a front elevational view, partially in schematic form, of another embodiment of my invention.

In general my method for the non-destructive testing of objects and members and for determining the existence of flaws in such members consists of transmitting an ultrasonic wave train to the member at a first location on the member to cause the wave train to travel in a predetermined path in the member and receiving ultrasonic waves at a second location spaced apart from the first location while discriminating against waves having a direction of travel which is the same as, or opposite to, the introduced waves. As a consequence, the wave trains which are deflected by flaw in the member will be especially sensed by the receiving mechanism, whereas waves traveling in the same direction as introduced are discriminated against. The apparatus for introducing and receiving the wave trains includes wave directors and attenuators of particular configurations as hereinafter described.

With particular reference to the application of my method for the non-destructive testing of tubular objects or members, my method consists of transmitting an ultrasonic wave train into the tubular object at an angle to the longitudinal axis of the tubular object so that the wave travels in a helical path in the wall of the tubular member away from the point of introduction of the ultrasonic wave into the tubular member and receiving the helical wave at a position spaced from the position at which the wave is introduced into the tubular object. The apparatus for introducing and receiving the helical waves includes wave directors or attenuators of particular configurations as hereinafter described.

In FIGURES 1 and 2, there is disclosed apparatus which is substantially identical to that disclosed in application Serial No. 151,331, filed November 9, 1961, now Patent No. 3,186,216, of which this is a continuation-in-part. A tubular body or object 11 is provided for non-destructive testing. As shown in the drawings, it can be in the form of a pipe as for example, a pipe having an outside diameter 36 inches and a wall thickness of approximately 5/8 of an inch with ends 12 and 13. A wave director and attenuator 14 which also may be called an offset is mounted on each end of the pipe 11 and has a particular configuration as hereinafter described.

The wave directors 14 are secured to the ends of the pipe in any suitable manner. For example, they can be welded to the ends of the pipe or they can be embedded in the ends of the pipe by the use of sufficient pressure. If the ends of the pipe are smooth, an auxiliary, softer strip of metal such as aluminum foil is introduced between the wave director 14 and pipe 11 so that the strip deforms under pressure to provide a more intimate contact. The primary purpose is to establish intimate solid material contact, i.e., uniform contact between the transducer offset or wave director and attenuator 14 and the walls of the pipe so that there is a good transfer of ultrasonic energy from the offset to the pipe 11, or vice versa, as hereinafter described.

It is generally desirable that the wave directors and attenuators 14 be formed of relatively hard material such as hardened steel so that they can be held against or forcibly pressed into the end or the side of an object with a force which is adequate to deform or upset the generally softer material of the object to be insonated, i.e., filled with ultrasonic waves, to assure a uniform, reproducible low loss continuous metal or solid material path for the desired and selected wave trains. In this manner, the deformed metal of the object being tested serves as a couplant between the ultrasonic wave trains in the wave director and attenuator and the object to be insonated.

An electroacoustic transducer 16 is mounted on each of the wave directors or offsets 14 and may be of any suitable type such as Type Z transducer manufactured by Branson Instruments, Inc. of Stamford, Conn., or lead titanate zirconate discs manufactured by Clevite Corporation, Cleveland, Ohio, or lead metaniobate discs manufactured by General Electric Company. As set forth in copending application Serial No. 245,862, filed Dec. 19, 1962, a suitable impulse ultrasonic wave train source such as an electric arc or explosives may also be used. The transmit transducer is identified with the letter T, whereas the receive transducer is identified with the letter R. The transmit transducer T is energized by pulses or waves from a suitable transmitting, receiving and display apparatus 18 of a conventional type such as Model 5 Ultrasonic Sonoray manufactured by Branson Instruments, Inc. Alternatively, such apparatus can consist of an E–H Research Laboratories pulser, Model 1512; an E–H Research Laboratories amplifier, Model 1513; a Tektronix oscilloscope, Model 533A; and a Panoramic Instrument Spectrum Analyzer, Model SPA–3. To provide readout with selected and different pass channels, a suitable set of filters or matching circuitry can be used with the received signal to give several channels each at a different frequency.

As is well known to those skilled in the art, such apparatus can produce pulsed waves and can receive the same and display them on a screen 21.

The application of pulses to the transmit transducer T causes ultrasonic wave trains to be formed in the wave director 14 and causes a substantially uncollimated angularly diverging group of ultrasonic wave trains to enter the object 11 at point A as indicated by the waves 26 of only one hand or direction of rotation with respect to the end of the tubular object 11. These wave trains emanate from the offset or director 14 and propagate in a direction which is away from the wave director and follow a helical path around and longitudinally of the wall of the pipe toward the other end of the pipe.

If there is a flaw in the object or pipe 11 as indicated by the flaw C, at least one of the waves 26 will reflect, refract or diffract from the flaw C to provide a substantially uncollimated angularly diverging group of ultrasonic waves 28 which also follow a similar helical path around and longitudinally of the wall of the pipe toward the other end of the pipe but in the opposite hand or direction of the waves 26. One of the reflected, refracted or diffracted waves 28 will be received by the receive wave director 14 at point B on the other end of the pipe and by the receive transducer R which converts the ultrasonic wave train to a suitable electrical signal which is transmitted to the apparatus 18.

An enlarged detail view of the offset or wave director and attenuator 14 used in FIGURE 1 is shown in FIGURE 2. As shown, this embodiment of the wave director looks somewhat like a deformed triangle. It is provided with two inclined surfaces 36 and 37. The wave director is also provided with an end wall 38 and a contact face 39. The contact face 39 is adapted to engage the end wall of the pipe as shown in FIGURE 1. The wall 37 is provided with a small recessed face 41 upon which the transducer 16 is mounted. The wave director 14 has a thickness which can be approximately the same as the thickness of the tubular object being tested; for example, for testing pipe having a wall thickness of ⅝ of an inch, the wave director should have approximately the same or lesser thickness.

The angle alpha ($\alpha$) between a line perpendicular to the face 41 and a line perpendicular to the face 39 (representative of a ray of the ultrasonic wave train) determines the angle at which the maximum intensity or desirable orientation wave trains are introduced into the end wall of the pipe. The wave trains are not highly collimated but are angularly diverging because it is desired to insonate (irradiate with sound) substantially the entire wall of the pipe. For example, as shown, the angle alpha can be 35°. However, it should be realized that an angle from substantially 0° to substantially 90° can be use if desired but most applications can most readily utilize an angle from approximately 2° to 55°. In choosing these angles, it should be realized that the helical waves can only increase in length discontinuously, that is, with fixed offsets they can only go from one complete loop to two complete loops because nothing in between is usable or sensed at a fixed receive point on the opposite end of the pipe.

A line which is perpendicular to the face 39 is a line which is also parallel to the longitudinal axis of the tubular member 11. A line which is perpendicular to the face 41 is also parallel to the axis of the transducer 16. There should be a proper balance between the signal attenuation and the path swept by the helix. The greater the angle of the helix, the more loops the helix must make in traversing the length of the pipe and hence the greater the attenuation of the signal introduced into the pipe. However, this provides a greater area of the pipe which will be swept by the particular wave train. For example, it is apparent that a helix that makes only one loop in the pipe sweeps less area and sees less potential flaw area than a helix which makes two loops or three loops in the same length of pipe. Also, because of the desire to limit the number of receive transducers required, it is desirable to use a beam of ultrasonic waves which are relatively angularly widely dispersed.

The receive wave director 14 discriminates between the reflected wave trains and the unreflected wave trains. This is made possible because the reflected wave trains travel in a hand which is opposite to the direction in which the unreflected wave trains travel. In order to avoid spurious signals from the unreflected wave trains, the wave director 14 includes a wave trap between the surfaces 36 and 37. When an unreflected wave train 31 is trapped, it is reflected back and forth between the surfaces 36 and 37, as shown by the broken lines in FIGURE 2, until it is effectively attenuated. Thus, it can be seen that the receive transducer wave director 14 serves as a means for providing a high signal to noise ratio and a "go" or "no-go" differentiation between the signal reflected by the flaw and an unreflected wave train (noise). This application of a wave trap for helical waves of undesired orientation is fundamentally different from wave traps such as are commonly used to attenuate undesired modes originated at the interface between two materials of different acoustic impedance because for a receive condition, the wave trap in my invention not only attenuates these undesired modes originating at the interface between the wave director and test object, but also receives and attenuates ultrasonic wave trains which enter from the material being tested. The only reflected ultrasonic wave trains which will be detected by the receive transducer 16 are those which arrive at such an angle that they strike the end of the tested object or pipe 11 at a point at which the wave director is secured to the end of the pipe. For this reason, practically all of the waves which are reflected by the flaw C are dissipated in the end of the pipe because the helices intersect the angle of the pipe at positions which are circumferentially spaced from the position at which the receive wave director 14 is secured to the pipe.

The face 39 has been positioned in such a manner with respect to the face 41 that if an unreflected wave enters the wave director at any point on the face 39 and strikes the face 36 or 37, this unreflected wave, even by mode conversion, can never reflect from the surface at an angle greater than 90° and for that reason can never excite the transducer 16 to create a spurious flaw signal.

In order to preclude, or at least minimize or control, undesirable diffraction of the ultrasonic wave trains, means is provided in each of the wave directors 14 and consists of a plurality of parallel slots 43 approximately 1/16 inch wide which are cut through the wave director 14 generally parallel to face 41, and which extend inwardly to a line perpendicular to the face 41. These slots 43 are spaced approximately ¼ inch apart, which spacing is equivalent to a few wavelengths at 2–3 mc. in steel. For the transmit wave director 14, these slots cause wave trains generated by a transmit transducer T, veering towards the end wall 38, to successively diffract as these wave trains intercept each slot end. If these slots were not present, the total transmitted wave train in line with edge 44 would diffract at edge 44 of the intersection of the wave director contact face and the object 11 to be tested. This diffraction around edge 44 which, to the ultrasonic waves, is a sharp diffracting edge, could cause some modes of the transmitted wave trains to create helical wave trains of opposite rotational direction such as at angle $\beta$. If sufficiently diverted, these diffracted helical wave trains of opposite direction of rotation move in the same direction as a wave train reflected by a flaw and, therefore, give a false or spurious flaw indication. The use of multiple diffracting slots 43 or diffraction wave traps thus attenuates wave trains which otherwise intersect and diffract around the sharp edge 44 and serves to attenuate, minimize and control diffracted spurious wave trains.

A slot 45 extends into the body of the wave director adjacent to the transducer face 41 to preclude radiation from entering the right-hand side attenuation area as viewed in FIGURE 2 directly from the transducer 16. The intensity of a transmitted signal reflected complexity within the attenuation area to yield a wave train of opposite helical rotation such as angle $\beta$ in FIGURE 2 is markedly reduced, and in most cases eliminated. The slot 45 also enhances or tends to guide the acoustic energy entering the object 11 from a transmit transducer. The combined effect of slot 45 and slots 43 is also to provide a controlled collimating device whereby the width of the angular beam of ultrasonic wave trains emanating from transducer 16 and entering the inspected object 11 through contact face 39 is limited by the space between slot 45 and slots 43. Multiple slots and combinations of slots can be used so long as the general arrangement as previously described is maintained.

In some instances, it may be desirable to place the transmit transducer 16 on surface 41 such that no direct wave train path is possible between transmit transducer 16 and the surface 39 contacting the end of the object to be tested. In this way, all signals used to insonate the object to be tested are diffracted signals which have been diffracted around the slots 43. This approach to insonation of the tested object uses controlled diffraction to suitably insonate the object.

In the wave director and attenuator or offset 14 shown in FIGURE 2, the wave trap is in reality only a two-dimensional wave trap because the unreflected wave train 31 only bounces between the walls 36 and 37. Where it is desired to obtain additional attenuation of the reflected wave trains, a wave director 46 can be utilized which has a three-dimensional wave trap. This wave director 46 is shown in detail in FIGURES 4 and 5 and is formed of a suitable material such as hardened steel and having a suitable thickness approximately the same as the tested object as, for example, ⅜ to ⅝ of an inch and with a width of 2½ inches and a length of 7 inches. The wave director 46 is provided with parallel side surfaces 47 and 48. The wave director also includes a flat surface 49 perpendicular to the surfaces 47 and 48 which is adapted to be attached or pressed into the end wall of the pipe or to be placed on the side of the pipe at a suitable angle, as for example, 35° with respect to a tangent to the side of the pipe at the point of contact as shown in FIGURE 3. It is also provided with a surface 51 which forms a suitable angle with respect to the surface 49 so that the wave trains introduced into the wall of the pipe are introduced at the desired angle. For example, the surface 51 can form an angle of 35° to surface 49 so that the wave trains are introduced into the pipe at an angle of 35°. The transducer T is secured to the surface 51 in any suitable manner such as by means of an adhesive or a bracket (not shown) to provide a good sonic connection between the surface 51 and the transducer T. The wave director 46 is also provided with another substantially flat surface 52 which joins surfaces 49 and 51. Another flat surface 53 is provided and is preferably parallel to the surface 49 and can be utilized for receiving a ram or press so that the surface 49 can be pressed into or against the object to be tested. If desired, a suitable preferentially deformable strip, such as an aluminum foil, may be placed between the wave director and the tested object.

The right-hand extremity of the wave director 46, as viewed in FIGURE 4, is provided with upper and lower inclined surfaces 56 and 57 on each side as viewed in FIGURES 4 and 5. The tapers are formed so that relatively sharp edges 58 and 59 are formed and so that the right-hand end of the wave director and attenuator 46, as viewed in FIGURES 4 and 5, ends in a point 61. In the same manner as for the wave directors 14, a plurality of slots 62 and a slot 63 are provided in the wave directors 46 to preclude and control undesired diffraction effects and to enhance a transmitted signal as hereinbefore explained.

These wave directors and attenuators 46 can be utilized in the same manner as the wave directors and attenuators 14. The unreflected wave trains represented by the line 31 pass into the portion which is diamond-shaped in cross-section of the offset and bounce upon the surfaces 56 and 57. As pointed out previously, the surfaces 56 and 57 are inclined so that the unreflected wave 31, in addition to being bounced up and down, is bounced from side to side as viewed in FIGURES 4 and 5 to thereby cause the wave to pass through more of the attenuating material and to more effectively scatter the unreflected wave to attenuate the wave. The unreflected wave 31, therefore, travels in three dimensions which increases the amount of bouncing mode conversion and the internal scattering to thereby improve the signal to noise ratio of the reflected or bounced wave with respect to the unreflected or unbounced wave.

Figure 7:
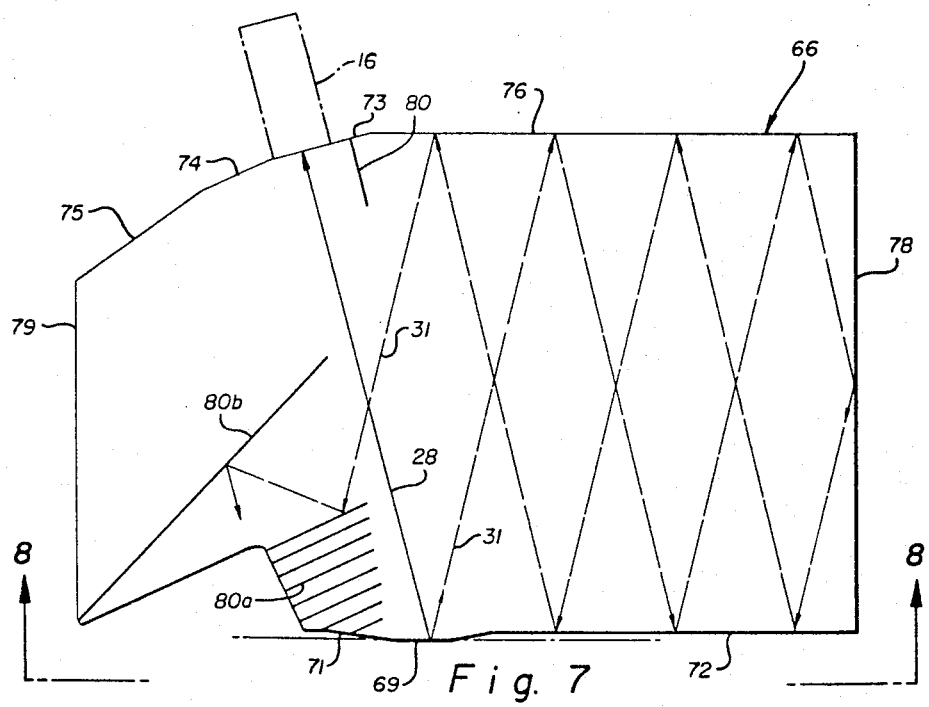
FIGURE 7 is a side elevational view of the wave director and attenuator utilized in FIGURE 6.
Figure 8:
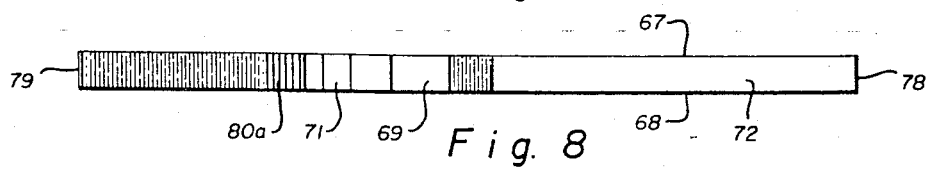
FIGURE 8 is a bottom plan view of the wave director and attenuator shown in FIGURE 7.

In FIGURES 6, 7 and 8, another type of wave director and attenuator or transducer offset is shown. It is substantially rectangular and is formed of a suitable material such as hardened steel. It can be of any suitable size, as for example, a thickness of ⅛ to one inch, a width of approximately 8 inches, and length of approximately 12 inches. The wave director 66 is provided with flat parallel surfaces 67 and 68. It is also provided with a relatively short, flat surface 69 perpendicular to the surfaces 67 and 68 which is adapted to engage the object to be tested as, for example, the wall of the pipe 11 as shown in FIGURE 6. The wave director is also provided with surfaces 71 and 72 which are recessed above the surface 69 so that only the surface 69 will engage the object being tested. The wave director 66 is provided with flat surfaces 73, 74 and 75 inclined at differing angles which are adapted to receive the transducer 16 as shown. These surfaces 73, 74 and 75 are inclined with respect to the surface 69 for the purpose of introducing the wave train into the object at a desired angle as hereinbefore described. In certain application, it is desirable to introduce the wave trains into the object at a relatively small angle, and for this reason the surface 73 is inclined with respect to the surface 69 at a relatively small angle as, for example, 7°. The other surfaces 74 and 75 are provided to permit the introduction of wave trains at greater angles. A flat surface 76 is provided on the wave director 66 and can be utilized for pressing the surface 69 of the wave director 66 into intimate contact with the object being tested. The wave director is also provided with end surfaces 78 and 79. The surface 78 can be serrated, heated or coated with sound absorbing material to further attenuate unreflected waves 31.

I have found that the thickness of the transmit wave director can directly affect the character and polarization of the generated wave trains. For example, at approximately 2.25–2.5 mc. in steel, the wave length of various modes of complex waves varies between .07″–.1″. By varying the wave director thickness or the orientation and/or thickness of the shim between the wave director 14 and the pipe, it is possible to selectively pass or generate by reflection/mode conversion certain modes of the complex waves travelling in the wave director.

The face 73 of the wave director and attenuator or offset 66, which is shown in FIGURES 6, 7 and 8 of the drawings, is utilized when it is desired that the reflected helical wave travel through no more than one loop between the transmit and receive wave directors and particularly where it is desired to detect flaws in relatively long tubular members such as in long lengths of pipe as, for example, a pipe 40 feet long. Such an arrangement is particularly desirable where it is necessary to identify pulses automatically as, for example, in equipment in which the first pulse received is a pulse indicating a flaw. The other transducer faces 74 and 75 can be used where a greater helical angle or additional helical loops are desired. As shown in FIGURE 6, for a second flaw such as at C′, the reflected or flaw indicative wave train 28′ is at a greater helical angle and would be sensed by a second receive transducer 16 on the wave director 21 at face 75 at a greater angle with respect to pipe contact face 69.

In order to keep the number of loops through which the reflected helical wave passes to less than one, it is necessary that the ultrasonic wave trains be introduced at point A at a relatively small angle particularly if the pipe is very long. This is made possible with an offset or wave director such as the wave director 66 shown in FIGURES 6, 7 and 8. Because of the positioning of the transmit transducer on the offset 66, the ultrasonic wave trains will be introduced at an angle determined by the angle of the surface 73 with respect to the surface 69. The reflected wave train 28, as it is received, passes into the wave director 66 and is received by the transducer 16. The unreflected wave train 31 is attenuated by its lossy path through the right-hand side of the wave director as viewed in FIGURE 7 and by successive reflections, mode conversions and interferences, as well as its long path through the wave director 66 creates a longer transmit time relative to the reflected wave train 28 so that it may be easily gated out by electronic circuitry.

A slot 80 is formed in the wave director adjacent the face 73 and extends toward the face 69 and precludes wave trains from the transducer 16 from entering the right-hand side of the wave director 66 as viewed in FIGURE 7. (Slot 80 also serves to concentrate more acoustic energy at the pipe contact face 69.) Slots 80a are formed in the wave director 66 generally adjacent to the pipe contact face 69. These slots 80a intersect with sound wave trains being transmitted from transmit transducer 16 or surfaces 73, 74 or 75 and reduce diffraction around the point of intersection of the pipe and wave director at the left side of surface 69 which diffracted signal creates a false flaw indication signal of opposite helical rotation to that transmitted as previously described. Similarly, a slot 80b, formed in the wave director 66 in the same general direction as the slots 80a, but at a greater angle reduces the level of transmitted unreflected wave trains 31 bouncing about in the wave director as shown in FIGURE 7 which might create a false flaw indication signal. The same general combination of slots and wave director shape can be used for the receive wave directors with similar value. As previously discussed, for some applications, it is desirable to have the diffraction trap slots 80a of such a length that no direct path for ultrasonic wave trains is possible between surfaces 69 and 73 but diffracted wave trains are utilized which diffract around the right extremity of slots 80a. For the same reason the slot 80 may be placed adjacent the faces 74 and 75 if desired.

If serrations are provided on the surface 78, the serrations should have a dimension which is approximately equal to the wave length of the sound waves. Such a serrated surface tends to further scatter the undesired ultrasonic wave train 31 and to lower its intensity with respect to the generally undamped flaw indicative wave 28 of opposite hand or direction of helical rotation within the insonated object. Any sound absorbing coating placed on the surfaces 67, 68, 72, 76 and 78 will still further attenuate the undesired wave 31.

The surfaces 71 and 72 are spaced about the flat surface 69 to assure proper angle of entry. The surface 69 is relatively small so that the end of the pipe to be engaged can be readily upset or contacted to make possible the intimate contact hereinbefore described between the wave director and the pipe or object to be tested. In order to preclude or control undesirable diffraction effects, a plurality of spaced, substantially parallel slots 80a opening into the faces 69 and 71 are formed in each wave director 66 and may terminate in a line parallel to the path of the ultrasonic wave train in the wave director and generally perpendicular to the faces 73, 74 and 75. These slots operate in the same manner as the slots 43 in the wave directors 14.

In order to enhance the attenuation of unreflected waves, it may be desirable to taper or reduce to a thinner section certain portions of the wave director. For example, the portion of the wave extending to the right as viewed in FIGURE 7 from a line between the face 73 and the face 69 can be tapered or reduced to a thinner section. For polarization of the transmitted wave train, the left-hand side of the wave director can be tapered or reduced to a thinner section. Also to enhance polarization the wave director can be tapered from top to bottom as viewed in FIGURE 7 while still providing a relatively large face for transducer contact.

The offset or wave director 66, shown in FIGURES 6, 7 and 8, is particularly adapted for the testing of drill pipe or other tubular, curved or flat objects. One arrangement showing the use of these wave directors or transducers in such an application is shown in FIGURES 9, 10 and 11.

In FIGURE 9 is shown the conventional derrick 81 utilized for drilling wells. A drill pipe 82 is shown extending down into a well 83. As the drill line is being raised, as for example for the changing of drill bits, the sections 84 as they are removed can be placed in a testing apparatus provided in one side of the drilling rig or derrick 81. This testing apparatus consists of a pair of jigs 86. These jigs consist of a plurality of wave directors 66 which are arranged to contact the ends or sides of the pipe sections. As shown in FIGURE 11, for end contact, a plurality of relatively large offsets or wave directors 66 can be utilized. These wave directors 66 are fastened together by a ring 87 which is secured to the surfaces 76 by suitable means such as welding. Means is provided for guilding the pipe section 84 into contact with the wave director 66 or for guiding the fixture 86 onto the end of the pipe and consists of a loosely fitting ring 88 which is secured to the ring 87 by brackets 89.

In the embodiment shown in FIGURE 9, one of the fixtures or jigs 86 is mounted upon the base 91. After a pipe section has been raised by the block and tackle assembly (not shown) which has a line 92 secured to the pipe section 84 by a pipe clamp 93, the pipe section or joint is unthreaded from the drill string 82 and its lower end is shifted into a position so that it can be lowered on top of the wave directors 66 in the lower jig 86. As soon as this has been accomplished, a separate block and tackle assembly (not shown) can be utilized for lowering the other fixture 86 onto the other end of the pipe section or joint 84. Additional weight can be provided on the upper jig to ensure proper contact between the wave director 66 and the pipe joint.

The signals are applied to the transducers 16 on one of the fixtures 86 from a test apparatus 96 which is mounted on a stand 97 through cables 98. Ultrasonic wave trains are formed which are introduced into the pipe section 84 and travel in a helical path longitudinally of the pipe section 84. If reflected helical wave trains are received by any of the transducers in the fixture 86 mounted on the other end of the pipe, a "no-go" indication will be given by the test apparatus 96. If there are no flaws in the pipe, a "go" indication will be given.

As soon as the pipe has been tested, the upper fixture 86 can be removed and the pipe section or joint 84 lifted out of the lower fixture 86 and the pipe section placed in the pipe stack 99 and located within the derrick 81. Additional sections or joints can be tested in the same manner until all of the sections have been tested.

From the foregoing, it can be seen that it is possible to check objects having a relatively small diameter while still utilizing wave directors or offsets which are relatively large in size merely by positioning them as shown in FIGURES 10 and 11. Alternatively, the wave directors 66 can be positioned against the end of the pipe so that the sides 67 and 68 are parallel to a tangent to the outer circumference of the pipe section 84 and so that the end 78 projects out from the side wall of the section 84.

In FIGURES 12 and 13, there is schematically shown a wave director 101 which is very similar in design performance to the wave director 66. It is provided with an inclined surface 102 adapted to receive a transducer 16. It is also provided with a flat surface 103 which is adapted to make intimate contact with the object to be insonated and which is similar in function to the surface 69 of the transducer 66. Means is provided for mounting the wave directors and attenuators or offsets 101 in intimate contact with objects to be tested and consists of a shoe 106 which is provided with a curved lower surface 107 which corresponds to the curvature of the object 11. The shoe is provided with ridges 108 and 109 on opposite sides. These ridges will firmly engage the surface of the pipe and will serve to stabilize the shoe or wedge 106.

As shown in FIGURE 13, the wave director or offset 101 is mounted in the shoe or wedge 106 in such a manner that it forms an angle of 2°–40° with respect to surface 107. It is positioned in this manner so ultrasonic wave trains created by the transducer 16 enter the wall of the pipe 11 at the same angle as if the transducer 101 had been mounted on the end of the pipe.

Means is provided for releasably forcing a pair of wave directors 101 into intimate engagement with the outer walls of the pipe 11 and, as shown in FIGURE 12, consists of a pair of chains 116 and 117 of a suitable type. Preferably, the chains should be ones which have one degree of freedom or less as, for example, Morse type chains manufactured by Linkbelt. After the chains 116 and 117 have been tightened as much as they can by suitable means (not shown), a hydraulic or pneumatic ram 118 is positioned between the shoes 106. The shoes are pushed apart by the ram with a mechanical advantage equal to the tangent of the angle $\theta$ to force the inclined flat face 103 of each of the offsets or wave directors 101 into engagement with the outer surface of the pipe 11 to provide intimate contact between the of surface 107 and the outer surface of the pipe 11. In this way, it is possible to apply a very large force to the wave directors 101 to ensure that an excellent contact is made between the wave directors and the pipe.

As explained in copending application Serial No. 151,-331, filed November 9, 1961, now Patent No. 3,186,216, such an arrangement can be readily utilized for checking girth welds in a pipe. However, it is also apparent that, if desired, such an arrangement can be utilized for checking for flaws anywhere in the pipe merely by positioning offsets 101 at longitudinally spaced positions on the pipe 11 in a manner similar to that hereinbefore described. The mode of operation is very similar to that hereinbefore described with the exception that the helical waves are introduced and received in the side walls of the pipe rather than in the ends of the pipe.

The primary advantage of the arrangement shown in FIGURE 12 is that the wave directors can be readily removed and shifted along the pipe as desired. The apparatus is also of the type which can be utilized in the field.

By using a suitable expanding mandrel, the wave directors 101 may be forced against the inside diameter of a tubular object to effect a simulated end contact from the side in the same fashion as for the outside side mounted wave director.

In FIGURES 14 and 15, there is shown another offset or wave director 121 which has substantially the same configuration which is similar to the configuration of the offset 66 shown in FIGURES 7 and 8. However, in this case, the main body 122 of the offset or wave director 121 is formed of a suitable translucent or transparent material such as glass or plastic. A wear shoe 123 of a suitable material such as steel is secured to the lower part of the glass portion 122. This wear shoe 123 is provided with a flat surface 124 which is adapted to be positioned in intimate contact with the object to be tested. A pair of struts 126 are provided on opposite sides of the glass portion 122 and the wear shoe 123 and have their lower extremities secured to the wear shoe. These struts 126 terminate at the upper portion of the glass portion 122 and make it possible to apply relatively large forces to the wear shoe 123 through the struts to force the flat surface 124 into intimate contact with the body or object 11 to be tested. A flat surface 128 is provided for receiving a transducer 16 if it is required and serves the same purpose as surfaces 73, 74 and 75 of the embodiment shown in FIGURES 7 and 8. This surface 128 is positioned at an angle with respect to the flat surface 124 so that if the wave director 121 is utilized for transmitting transducer, the ultrasonic wave trains will be introduced into the object 11 at an angle which differs from the longitudinal axis of the tubular members so that the ultrasonic wave trains will travel in a helical path longitudinally of the pipe.

The wave director 45 is provided with antidiffraction shielding and collimation slots 129 which are positioned in the same manner and serve the same function as the slots 80, 80a and 80b in the embodiment shown in FIGURES 7 and 8.

When the wave director 121 is utilized for the reception of reflected or bounced wave trains 28 as shown particularly in FIGURE 15, the reflected ultrasonic wave train 28 will travel through the metal shoe 123 and into the glass upper portion 122. The sound waves, as they enter the glass portion 122, serve as a source of compression and rarefaction to vary slightly the local index of refraction of the glass during the passage of the sound wave.

The exact position of the sound wave within the wave directors 121 can be determined by use of a polarized light source 131 which shines a beam of polarized light 132 onto and through the wave director 121 as indicated by the spot 133. In comparing the observed position within the glass with that of the wave train being inspected, account must be taken of the refraction between the shoe 123 and the glass 122. As is well known to those skilled in the art, polarized light in one plane of transverse vibration can be considered to be composed of two mutually perpendicular component vibrations. When any phase difference is introduced between them by causing one to be retarded by passing through a longer or more dense (higher refractive index) optical path than does the other, various degrees of elliptical polarization are produced. This elliptical polarization causes a variation in intensity of the transmitted polarized light which can ve sensed by suitable means such as a photosensitive sensing device 134 positioned on the other side of the wave director 121. As the index of refraction of the glass is changed in the area 133 through which the beam 132 passes by the ultrasonic wave train 128 which also passes through the area beneath the spot, the plane of polarization is rotated depending upon the intensity of the compression rarefaction. Thus, by means of the photosensitive sensing apparatus 134, it is possible to immediately determine when an ultrasonic wave train 28 is passing through the spot 133 covered by the polarized light beam 132.

By utilizing a relatively small spot, it can be seen that it is possible to determine the precise angle and position of the received wave train 28. For example, it is possible to utilize a spot as small as one-thousandth of an inch. It can be seen that this gives a great advantage in determining the angle of receipt of the wave train 28. With conventional piezoelectric transducers, the size of the transducer is relatively large as, for example, one-half inch in diameter so that it is only possible to determine the position of the receive wave train within one-half inch.

From the foregoing, it can be seen that the polarized light source 131, together with the photosensitive apparatus 134, serves as an effective transducer which is much more sensitive to the angle and intensity of the wave train. Because of this ability to more precisely locate the desired wave reflected wave train 28, it is possible to tolerate a lower signal to noise ratio between the bounced flaw indicative waves (signal) and the unbounced spurious wave trains (noise).

The optical properties of the translucent material utilized such as glass can be locally and continuously varied more easily than the sonic properties of metal so that additional bounced wave discrimination can be built into the transparent or translucent material utilized for the offset.

In FIGURE 16, there is shown another offset or wave director 136 which is similar to the wave director 66. It is provided with two transducers identified as R and R'. The transducer R is positioned so that it will only receive a reflected or flaw indicative wave train. The signal from the receive transducer R is supplied to a ratiometer or comparator 137 together with a signal which is supplied by the receive transducer R'. R' is positioned so as to receive only unbounced helical waves directly from a transmit transducer system on the opposite end of the pipe 11. Since the unbounced helical wave is substantially constant in intensity, the signal received by the receive transducer R is affected only by the variation in contact at point B between the wave director 136 and the pipe 11, or by a variation in contact of the transmit wave director on the opposite end of the pipe. The result is that the ratio between the signals between R and R' is the direct measure of the intensity of the reflected or flaw indicative signal and, in turn, the size of a flaw which is independent of contact variations between the wave director and the pipe.

Information can also be obtained about the flaw size and its geometry by the use of different transmit frequencies. The amplitude and the wave length of a sonic wave train reflected from the flaw is a relative function of the wave length and flaw size. Therefore, the received pulse, i.e., its shape and height as a function of wave train frequency can be similarly interpreted to provide data concerning the flaw size and shape and orientation.

In FIGURES 17 through 25, there are shown various wave directors of improved configuration which provide continuous variable angle transmisison of the wave trains into a member to be tested. As explained in connected with the embodiment illustrated in FIGURES 6 through 8, the surfaces 73, 74 and 75 are used to provide an adjustable angle of transmisison by discrete steps of the ultrasonic wave trains into the tested piece. In the embodiments shown in FIGURES 17 through 25, the transmission angle is adjustable to any angle within a predetermined range by means of a movable transducer holder which is in intimate contact with and slides along a continuous smooth convex arc on the wave director frame.

Means is provided for collimating, shaping and directing the transmitted and received ultrasonic wave trains into the test object and include a movable transducer holder with slots therein, acoustic lense means placed between the wave director and the test object, and the particular configuration of surfaces between the several parts of my novel apparatus.

Referring now more particularly to FIGURES 17, 18, 21 and 22, there is shown a wave director frame 142 made of steel die stock and having outer marginal surfaces 143–148. There is provided a planar surface 147 for intimately contacting a member to be tested as, for example, the wall of a pipe or edge of a plate. Surfaces 143 and 144 are recessed above the surface 147 so that only the surface 147 will engage the object being tested. The wave director frame 142 is also provided with a generally convex or curved surface 148 which is adapted to receive signals transmitted from the movable transducer holder 141. As hereinbefore described, in certain applications, it is desirable to introduce the wave trains into the object at a relatively small angle while for other applications, it is desirable to introduce the waves at a greater angle. The convex surface 148 provides a continuous variation in the angle of introduction with respect to the surface 147. The wave director is also provided with side walls surfaces 149 and a portion 146a of a top wall surface spaced apart from the transmit output surface 147 and along the normal thereto, for engagement with means for urging the wave director and attenuator against the object to be tested.

Considering the surface 147 as a point of reference for a set of coordinates having axes generally normal and in line with the surface 147, it will be seen that the wave director frame 142 is located in the first quadrant of such a reference system while the movable transducer holder 141 generally is rotatable within a fourth quadrant. The wave director frame 142 in the first quadrant serves to absorb and attenuate signals directed into the first quadrant and prevents their entry into the fourth quadrant or the transducer holder 141.

Means is provided for further attenuating and dissipating such undesired signals and consists of an epoxy coating 151 disposed upon the wave director frame surfaces 143, 146 and 149 as shown in FIGURE 17. The surfaces to be coated are roughened by sand-blasting and cleaned to provide an intimate bond between the frame 141 and the epoxy coating 151. The cleaning may be performed with any grease remover which leaves no residue, such as detergent. One suitable epoxy is manufactured by Armstrong Resin Inc. of Bellflower, California, and is designated as Armstrong T–230 silica loaded epoxy. Another suitable material is metal loaded epoxy. The epoxy coating is vacuum cast around the wave director frame and closely adheres to the surface of the frame because of its roughened, clean surface. The frame and coating strongly damp signals which travel a direction different from the direction defined by the movable transducer holder and the fourth quadrant generally.

The signals enter the frame and the area of the first quadrant and interact (reflect, refract, diffract and mode convert) with the surface of the frame 141 and the epoxy coating 151. The damping is produced by a combination of losses from the transmisison of the undesired signal from the low attenuation steel to the high attenuation epoxy and also from the surface motions generated by the complex waves built up within the wave director frame 142 by the interaction of the undesired signal with its roughened surfaces which are further acoustically damped by the adherent epoxy of about $\frac{1}{8}''$–$\frac{1}{4}''$ thickness.

Alternate damping surfaces and media may be provided for use in environments where epoxy type plastics are not acceptable. Such an alternate damping material may consist of thick sprayed metal coatings. Also, chemical etching of the wave director frame surface may be used to bring about near surface void pattern formation and thus create an irregular surface which tends to diffuse and incoherently scatter the undesired radiation.

The transmit input and output means including the movable transducer holder 141, which is mounted in a rotatable fixture or movable frame 153, is mounted on the left-hand side or in the fourth quadrant of the reference system. The convex surface 148 corresponds in function to the faces 73, 74 and 75 of the embodiment of FIGURE 7. The ultrasonic energy is coupled from the movable transducer holder 141 into the wave director frame through the surface 148 by means of a complementary, close fitting smooth concave surface 154 formed in the end of the movable transducer holder. The concave surface 154 may be plated with a deformable metal such as copper electroplated thereon to assure good acoustical contact with the surface 148. A transducer 156 is mounted in the movable transducer holder so that the center line of the transmitted or received acoustic beam is directed toward surface 154 of the holder and, in turn, is rotatable continuously around a point at or near the center of the wave director frame contact face 147. The transducer 156 is held firmly against a machined face 157 within the movable transducer holder by suitable means such as a screw 158 which may be tightened through a bore 159 in a handle 161.

The movable transducer holder frame 153 is connected to the wave director frame 142 by means of ball joints 162 and extensions 163 which are welded to bosses 164 formed at or near center of the surface 147 in the wave director frame. The bosses 164 are provided to establish means to which the extensions 163 may be welded while minimizing change to the metallurgical properties and structure of the wave director frame which would be caused by direct welding. The movable transducer holder frame is provided with arms 166 and a back plate 167 which transmits forces to the movable transducer holder to force the movable transducer holder face 154 into intimate contact with the surface 148. As shown in FIGURE 17, the surface 148 lies on a circle whose center is determined by the location of the bosses 164 near the transmit output surface 147. It is desirable that the movable transducer holder 141 and frame be mounted to rotate about a point generally near the transmit output surface 147 to provide that the ultrasonic wave train will be directed to pass through the surface 147 and into the test piece.

Means are provided for moving the movable transducer holder 141 and frame 153 about a line defined by bosses 164 and along the arc of surface 148. Such means includes a rotary actuator 168 mounted to the frame 142. The rotary actuator rotates a pair of arms 169. A pair of link arms 171 which are provided with ball joints 172a and 172b at their extremities are attached at one end to the arms 169 of the rotary actuator and at the other end to bosses 170 on the movable transducer holder. Thereby, rotation of the arms 169 generally is transmitted as linear motion of the link arms 171 to move the movable transducer holder 141 along the surface 148. One suitable rotary actuator is that produced by Houdaille Industries, Model 400000 SDR.

The ball joints 172b are generally in line and centered about the area of contact between the surfaces 154 and 148 which provides that movement of the movable transducer holder 141 and frame 153 may be accomplished while minimizing and rotating a force movement about the area of contact between the surfaces 154 and 148. Such a force movement would increase wear and the force necessary to rotate the movable transducer holder, and also decrease acoustic transmission through the area of contact. To facilitate sliding of the movable transducer holder 141 along the surface 148, the surface may be given a coating of grease.

Referring now more particularly to FIGURES 21 and 22, means are provided for forming a first collimation of ultrasonic wave trains and consists of a plurality of slots 173 which are formed in the movable transducer holder on each side of the beam path. The slots extend from the edges 174 and 176 of the tapered portion and towards the middle portion of the movable transducer holder 141 and generally between the surfaces 154 and 157 thereof to form a beam channel between said surfaces. The extent and direction of the slots 173 will now be described. It is generally found desirable to form a beam channel approximately one-quarter inch to one-half inch wide. Accordingly, the slots 173 are made to extend towards and within approximately one-half inch of the middle of the movable transducer holder. The slots 173 may be shaped to provide a flat or curved surface for acoustic beam shaping and are formed at an angle of approximately 60° to the center line of the ultrasonic wave path. Since the transducer generates an angularly divergent ultrasonic beam of about 20° to 30° angular dispersion, the slots 173 serve both to focus and collimate the transmitted ultrasonic wave and to permit passage of only those portions of transmitted or received ultrasonic wave trains having a desired direction. The movable transducer holder 141, excluding the contact surfaces 157 and 154 and also excluding the central channel for the desired beam path, is sand blasted and provided with a coating 177 of Armstrong T–230 silicon loaded epoxy or other ultrasonic sound wave damping material, ⅛ to ¼ inch thick, to provide additional attenuation of acoustic radiation traveling outside the beam channel.

The ultrasonic wave train generated by the transducer 156 and collimated within the movable transducer holder passes through the holder surface 154 and the wave director surface 148 and towards the transmit output surface 147. The limited contact between transmit input surface 148 and between the movable transducer holder surface 154 and transmit output surface 147 and acts as second and third collimation means for transmitted or received ultrasonic wave trains. As previously discussed on col. 5 and following, the wave length of the acoustic radiation used compared to the dimensions of the wave director and surface 147 can cause diffraction of some modes of the ultrasonic wave trains to occur upon passage of the waves through the surface 147 into the test piece and through surface 154 into the frame 142. Consequently, the ultrasonic radiation from the transmitting transducer must pass through several stages of collimation in traversing the wave director. At each, diffraction and attenuation of the diffracted radiation portion often results which serves to narrow the angular dispersion of the beam collimating the beam so that the final angle of dispersion of the beam entering the test object is a small portion of that generated at the transmit transducer 156.

A related but reverse sequence occurs when the wave director is used as a receiving device. It will be noted that the design of the wave director permits its use either as a transmit wave director, or as a receive wave director, or both. When used as a receive wave director, collimation is provided by the restricted areas at the contact between the wave director and the test object at surface 147, between the holder surface 154 and surface 148 and a third, by the inclined slots 173 in the movable transducer holder itself. Generally, then, the construction of the wave director provides only for transmission and reception of ultrasonic wave trains that have a direction lying in one quadrant.

Referring now more particularly to FIGURES 19, 20, 23 and 24, there is shown another improved embodiment of a wave director and attenuator incorporating my invention and including readout means for electrically sensing the angular position of the transmit-receive means with respect to the test object.

In construction and operation, the wave director shown in FIGURES 19, 20, 23 and 24 is very similar to the construction and operation of the wave director shown in FIGURES 17, 18, 21 and 22. Referring particularly to FIGURE 19, there is shown a wave director frame 181 upon which is rotatably mounted a movable transducer holder 182. The frame 181 has a transmit output surface 183, side surfaces 184, front and back surfaces 184a, and is surrounded with a coating of silicon loaded epoxy 185 or other material which may be applied in the same manner as has been described previously with respect to the embodiment of FIGURE 17. The movable transducer holder 182 is maintained in close fitting relationship to the frame 181 and is rotatably mounted thereto by means of a movable transducer frame 186. A back plate 187 on the frame 186 is secured to the movable transducer holder 182 and is connected by arms 188 having ball joints 189 attached to their remote extremity to posts 190 welded to bosses 191 on the wave director frame 181. The movable transducer holder is provided with a surface 192 which is constructed to make intimate close fitting contact with a transmit input surface 193 of the wave director frame and with a surface 192a for receiving the output of a transducer. As in the embodiment of FIGURE 17, the surface 192 may be copper electroplated to assure high acoustic coupling at the contact with surface 193. The movable transducer holder and frame are rotated about the ball joints 189 by means of a pair of hydraulic reversible piston actuators 194 which are, in turn, operated from a hydraulic supply anud control valve 195. One suitable actuator is the hydraulic actuator, Model 330 hydraulic cylinder produced by Airoyal Manufacturing Co. of Livingston, New Jersey. A suitable two-position double solenoid directional control valve is Model DIL, by Vickers Inc., Division Sperry Rand Corp., Detroit, Michigan. Extension of the actuators 194 pushes out the piston rods 196 which are mounted to ball joints 197 connected near the surface 192 of the movable transducer holder 182 and to arms 188. As the actuator 192 extends, the movable transducer holder 182 will be rotated downward and to the left causing the actuators 194 to drop and rotate about their right ends which are rotatably secured by bracket 200 and pin 198. Suitable tubing 199 is provided to connect the input and output of the solenoid valve with the actuators 194.

Referring now more specifically to FIGURES 23 and 24, there is shown in elevation cross-section view the transmit-receive portion of the wave director 181 and the movable transducer holder 182. As shown, one or more slots 201 are formed in the movable transducer holder 182 astride the central portion thereof to provide the collimating channel feature as previously described with reference to the embodiment of FIGURES 17, 18, 21 and 22. The slots 201 extend from adjacent the edges of and towards the middle portion of the transducer holder 182 and generally between the surfaces 192 and 192a thereof to form a beam channel between said surfaces. It will be especially noted that the slots do not quite extend to the edge of the transducer holder 182 to provide structural reinforcement and an additional acoustic channel for diffracted or other spurious acoustic radiation.

The portions of the movable transducer holder 182 other than the central transmit channel 202 and the transducer contact and transmit contact surfaces 192 and 192a are sand blasted and vacuum cast in epoxy as hereinbefore explained with reference to the embodiment shown in FIGURES 17, 18, 21 and 22.

The transmit input surface 193 of wave director frame 181 generally lies in a much wider arc than the embodiment of FIGURE 17. Consequently, it is found desirable to provide a roughened surface and epoxy casting 203 for the more remote portions of the signal transmission portion of the wave director frame 181. The surface 193 generally lies on a circle which has a center at or near the transmit output surface 184.

Referring especially to FIGURES 19 and 20, means is provided for electrically sensing the angle of the movable transducer holder with respect to the center of rotation at the center of post 190 and consists of tangent $\theta$ potentiometer 204 having a driving gear 205 affixed to a shaft 205a therefrom. The potentiometer 204 is mounted to the movable transducer holder frame arms 188. A gear sector 206 complementary to the gear 205 is mounted to the wall of the wave director 181. One suitable tangent $\theta$ potentiometer is that manufactured as Model 5713 by the Helipot Division of Beckman Instrument Corp., Pasadena, California. The gear 205 of the potentiometer meshes with the gear sector 206 so that upon rotation of the movable transducer holder frame 186, the gear will be rotated by the sector to cause the potentiometer 204 to continuously vary a resistive value which can be electrically sensed and which indicates the angular position of the movable transducer holder with respect to the transmit output surface 183 or the normal thereto.

Referring now more particularly to FIGURES 19 and 20, there is also shown acoustic lens means for guiding ultrasonic wave trains between the wave director and the test piece while reducing acoustic diffraction generated by the discontinuities at the border of contact between the wave director and the test piece. These discontinuities are designated in FIGURE 19 as at A and B.

Such acoustic lens means includes discontinuity heaters 207a and 207b which heat the discontinuities such as at A and B. A heated discontinuity provides for attenuation and absorption of signals passing in the vicinity of the heated area. The lens means further includes coolers 208 which cool the zone 209 generally between the discontinuities A and B, the test piece and the wave director 181. The zone 209 on the wave director 181 between heaters 207a and 207b is cooled by coolers 208 generally at its midsection on each side of the zone 209 and between the discontinuities A and B. When suitably heated and cooled as hereinafter described, the zone also may form an acoustic lens of generally negative power for the transmission of ultrasonic energy through the relatively small aperture formed at surface 184 and the surface of the test object. The heaters 207a and 207b heat the area of discontinuity to a temperature of approximately 250° F. while the coolers 208 are set to hold the temperature at zone 209 at approximately ambient temperature. This combination of temperatures creates a local density gradient which tends to blur the otherwise sharp discontinuities at A and B. The temperature gradients in this zone tend to form an acoustic lens of generally negative power which increases the angular separation of received wave trains and angular separation of rays of acoustic radiation arriving from different directions. Heating the areas A and B increases the absorption and attenuation property of the material so that diffraction about these points is reduced.

The heating elements 207 can be constructed of resistive type heater wire such as Nichrome and the cooling elements 208 can be thermoelectric elements or conventional coils of hollow tubing containing a circulating fluid coolant.

Figure 25:
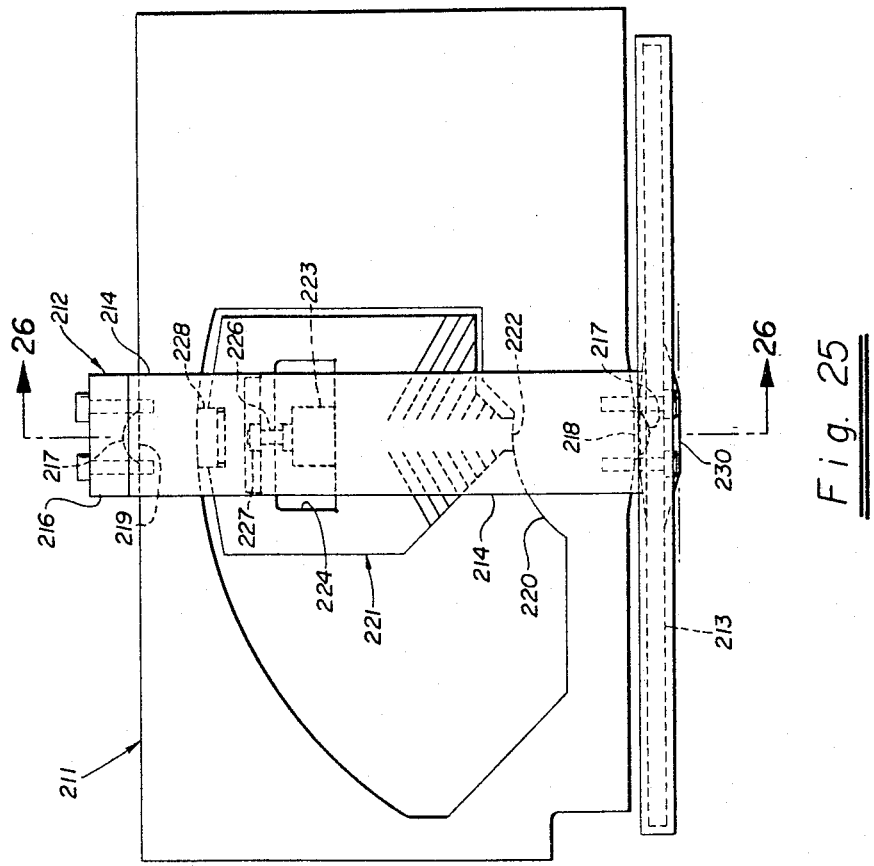
FIGURE 25 is a side elevational view of still another embodiment of my wave director and attenuator mounted in a solid angle scanning mounting.
Figure 26:
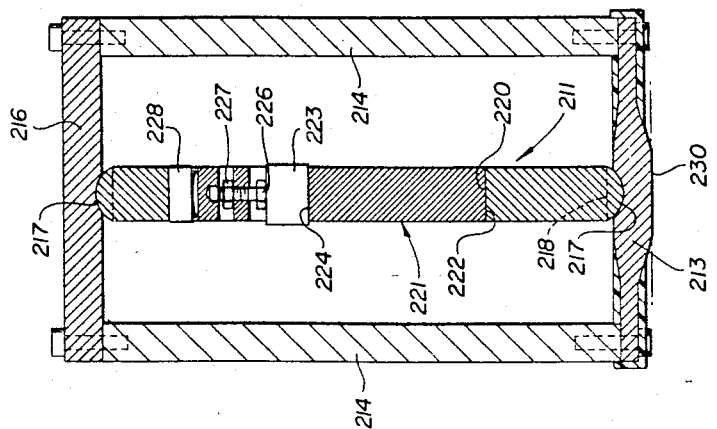
FIGURE 26 is a cross sectional view taken along the line 26—26 of the wave director and attenuator embodiment shown in FIGURE 25.

Referring now to FIGURES 25 and 26, there is shown a wave director 211. This assembly is suitable for side or end mounting on an object rotatably mounted in a wave director mounting 212. The mounting 212 consists of a bottom plate 213, side frame members 214, and a top frame member 216. The wave director 211 has two spherical or convex segments 217 brazed respectively to the transmit output surface 218 and to a surface 219 of the edge of the wave director 211 along the normal to and opposite from the transmit output surface 218. The spherical segments cooperatively engage spherical or convex depressions in the plate 213 and top member 216 so as to provide an acoustic transmission rotatable mounting for the wave director 211. Movement of the wave director frame 211 between the spherical segments provides rotation about a line normal to the transmit output surface 218. A movable transducer holder 221 is mounted within a cut-out portion of the wave director 211 so as to rotate about a transmit input surface 220 and provide continuous variable angular ultrasonic waves lying in the plane of the wave director 211. The holder 221 is provided with a surface 222 for cooperating with the input surface 220 of the frame 221, slots for collimating the beam, and a transducer 223 held in opening 224 by a screw 226 and nut 227. The holder 221, in particular its surface 222, is urged toward transmit input surface 220 by a flat expansible hydraulic cylinder 228.

Rotation of the wave director 211 about the axis defined by the spherical support segments 217 causes the surface 220 to sweep over an area generally lying on a sphere having a center near the output surface 217. The movable transducer holder can be positioned to lie over any particular small area within the spherical triangle by coordinating the angular position of the movable transducer holder 221 about the surface 220 and the angular position of the wave director 211 about the axis defined by the segments 217. Consequently, wave trains leaving the movable transducer holder may be directed to pass through the surface 218 at any predetermined angle within the solid angle covered by the aforementioned spherical triangle. Thereby, the range directions which may be selected are not limited to discrete values. Additional transmit output surface means are provided in the platform 213 and consist of the surface 230 which is adapted for abutting the surface of a test object. The platform 213 may be epoxy coated as shown to control undesired reflections. The construction and operation of the wave director 211 and the movable transducer holder 221 is otherwise generally similar and understandable by reference to the operation previously described with respect to FIGURES 17 to 24.

For clarity, I have not shown any epoxy coating for selected attenuation or servomechanisms for rotating the movable transducer holder 221 in the embodiment of FIGURES 25 and 26. However, it is obvious that both may easily be provided such, as for example, by incorporating those shown in the embodiments of FIGURES 17 to 24. Also, the embodiments of FIGURES 17 to 24 may be rotatably mounted in a frame such as that shown in FIGURES 25 and 26. I have, therefore, provided a construction with which the direction of transmitted and received wave trains may be adjusted and directed within a range which encompasses all angles within a predetermined solid angle.

It is apparent from the foregoing that I have provided a new and improved apparatus for generating, selectively transmitting and selectively receiving directed ultrasonic wave trains. I have also provided wave directors which are particularly useful in systems for automatic operation which give a "go" or "no-go" indication. Wave directors or offsets have been provided which make it possible to greatly increase the signal to noise ratio between the bounced (signal) and unbounced (noise) wave trains and also to more particularly determine the exact angle of receipt of the bounced or flaw indicating wave trains.

I claim:

1. In an ultrasonic wave director for use in the non-destructive testing of objects utilizing an ultrasonic generator, a body formed of material capable of carrying ultrasonic wave trains, said body having an input surface for ultrasonic communication with an ultrasonic wave generator and having an output surface adapted to be placed in communication with the test object for transmitting and receiving ultrasonic wave trains therefrom, the region of said body between the input and output surfaces defining ultrasound paths through said body, the portions of said body adjacent at least one side of said paths being provided with a plurality of spaced slots, said slots making a substantial angle to said paths, said output surface having a surface area generally commensurate with the area of contact between the ultrasonic generator and the input surface, said input surface, said output surface and said path being in general alignment and cooperating to direct ultrasonic wave trains from said input surface through the body and to and from said output surface, said body further including a portion adjacent said paths for attenuating and delaying received ultrasonic wave trains which travel in directions other than along said paths.

2. A wave director as in claim 1 in which the outer surfaces of the attenuating portion are roughened together with sound absorbing material disposed on the roughened surfaces.

3. A wave director assembly as in claim 5 together with means for mounting the wave director assembly for rotational movement about a line intersecting the output surface, the mounting means including a surface for intimately contacting the test object, the mounting means further including a surface for cooperatively mating with and intimately contacting the output surface to permit rotation of the wave director assembly within the mounting means, said output surface and cooperative mating surface being formed and constructed so that ultrasonic wave trains are transmitted from said output surface to said surface for intimately contacting the test object for all positions of the wave director in the mounting means.

4. A wave director assembly and mounting means as in claim 3 wherein said output surface and cooperative mating surface are formed by substantially convex and concave shaped portions of the wave director assembly and the mounting means to provide relatively large areas of good acoustic contact therebetween for enhanced transmission of ultrasonic wave trains.

5. In an ultrasonic wave director assembly for nondestructive testing of a test object using an ultrasonic transducer, a body formed of material capable of carrying ultrasonic wave trains, said body having an output surface for transmitting and receiving ultrasonic wave trains from a test object, the body having a curved input surface spaced apart from said output surface, said input surface having a radius of curvature whose center lies generally near the output surface, the region of said body between the input and output surfaces defining ultrasound paths through said body, said body further including a portion adjacent said paths for attenuating and delaying received ultrasonic wave trains which travel in directions other than along said paths, and a movable transducer holder mounted on said body, said movable transducer holder including a surface in intimate contact with the input surface of said body, and also including a second surface for receiving ultrasonic wave trains from a transducer, said second surface being spaced apart from said surface in intimate contact with the input surface of the body, means for pivotally mounting said transducer holder so that the holder is capable of being moved along the input surface between at least two angular positions relative to the output surface while maintaining intimate contact with the body, said transducer holder being formed with collimating means, said collimating means including a plurality of spaced slots in the movable transducer holder, said slots forming a channel for the transmission of ultrasonic wave trains to and from the transducer.

6. A wave director assembly as in claim 5 in which said output surface and said surface in intimate contact with the input surface are provided with surface areas commensurate with the area of contact between the transducer and the surface for receiving ultrasonic wave trains from the transducer so that said output surface and said surface in intimate contact with the input surface act to further collimate the transmitted and received ultrasonic wave trains.

7. A wave director assembly as in claim 5 together with power means mounted on the body and cooperatively connected to the movable transducer holder for positively shifting the movable transducer holder between two angular positions relative to the output surface and along the input surface.

8. A wave director assembly as in claim 7 in which said power means mounted on the body includes fluid actuated means.

9. A wave director assembly as in claim 7 in which said means mounted on the body includes electrically actuated means.

10. A wave director assembly as in claim 7 in which said means mounted on the body includes at least one fluid actuated device having a cylinder member and a piston rod member, one of the members being pivotally connected to the movable transducer holder and the other of the members pivotally connected to the wave director body.

11. A wave director assembly as in claim 8 in which said fluid actuated means is hydraulically actuated.

12. A wave director assembly as in claim 5 together with means for sensing the angular position of the movable transducer holder with respect to the output surface.

13. A wave director assembly as in claim 5 together with means for electrically sensing the angular position of the movable transducer holder.

14. The wave director as in claim 13 in which the electrical means comprises a potentiometer having a shaft extending therefrom for varying a resistive value from said potentiometer, means mounting the potentiometer on the pivotal support means, a gear mounted on said shaft, a mating gear sector mounted on the wave director body and engaging the gear mounted on the shaft and serving to rotate the shaft mounted gear to adjust the potentiometer as the movable transducer holder is shifted in angular position.

15. A wave director assembly as in claim 5 in which said means for attenuating ultrasonic wave trains includes a portion of the wave director body spaced apart from the portion of the body lying between said input and said output surfaces, said first named portion of the body having a roughened surface serving to disperse ultrasonic waves deflected by said roughened surface, and a sound absorbing median mounted in intimate contact with said roughened surface.

16. A wave director assembly as in claim 13 in which the electrical means comprises a potentiometer having a shaft extending therefrom, means mounting the potentiometer and means connecting the shaft of the potentiometer so that it is rotated as the movable transducer holder is shifted in angular position.

17. A wave director assembly as in claim 5 in which said input surface is electroplated with a deformable metal.

18. A wave director assembly as in claim 5 further including a sound absorbing material disposed in intimate relation with the portions of the movable transducer holder adjacent said channel, and in said slots.

19. A wave director for use in nondestructive testing of objects comprising a body formed of material capable of carrying ultrasonic wave trains, the body having a generally planar transmit output surface adapted to be placed in intimate contact with the object to be tested, the body having a curved transmit input surface spaced apart from said transmit output surface, said transmit input surface defining a circle having a center of rotation generally near the transmit output surface, a movable transducer holder mounted on said body, said holder including a first surface adapted for intimate contact with the transmit input surface and a second surface spaced apart from said first surface for receiving ultrasonic wave trains from a transducer, said movable transducer holder further including a plurality of slots extending inwardly from about the edges of the movable transducer holder to form a channel for the transmission of ultrasonic wave trains between said first and second surfaces, a layer of ultrasonic wave absorptive material dispersed on said movable transducer holder and in the slots therein except for said channel and said first and second surfaces, means for pivotally supporting the transducer holder so that the holder is capable of being slid along the transmit input surface while maintaining intimate contact therewith, servomotor means mounted on the body, at least one arm rotatably connected to the movable transducer holder and to the servomotor means for shifting the movable transducer holder between two angular positions relative to the transmit output surface and along the transmit input surface, the body being formed with means for attenuating ultrasonic wave trains which are traveling in directions other than that defined between the transmit input and transmit output surfaces, the attenuating means including a portion of the wave director body spaced apart from the area between the transmit input and output surfaces and having a roughened surface, and a layer of silicon loaded epoxy disposed on the roughened surface.

20. The wave director as in claim 19 in which said plurality of slots in said movable transducer holder terminates at a location spaced apart from the edge of the movable transducer holder.

21. The wave director as in claim 19 in which said plurality of slots terminate on the edge of said movable transducer holder.

22. In a wave director assembly for use in ultrasonic non-destructive testing of objects, a body formed of a material capable of carrying ultrasonic wave trains, the body having one surface adapted to be placed in intimate contact with an object to be tested, said one surface being small in area in comparison with the total surface area of the body, the body having an additional surface spaced from said first named surface, an ultrasonic transducer, a transducer holder mounting said ultrasonic transducer so that ultrasonic wave trains from the transducer pass through the transducer holder and are introduced into the additional surface to pass therethrough and thence through the body and out of said one surface, said transducer holder having a surface adapted to receive one face of the transducer and another surface spaced from said first surface adapted to engage the additional surface of said body, said second surface of said transducer holder being relatively small and together with said transducer defining a channel through said transducer holder for the transmission of ultrasonic wave trains, said transducer holder including slots formed on each side of said channel, said slots being inclined at a substantial angle of approximately 60° to said channel and serving to focus and collimate transmitted and received ultrasonic wave trains between said transducer and said second surface of said holder, and said slots being spaced apart along each side of said channel and pointing generally towards said second surface.

23. In an ultrasonic wave director for use in nondestructive testing of an object utilizing ultrasonic wave generator, a body formed of material capable of carrying ultrasonic wave trains, said body having an input surface for receiving the output of an ultrasonic wave generator and an output surface for introducing ultrasonic wave trains into a test object and for receiving ultrasonic wave trains from a test object, the region of said body between the input and output surfaces defining ultrasound paths through said body, said body including portions thereof adjacent said paths for collimating ultrasonic wave trains as they pass along said paths, said body further including portions adjacent said paths for attenuating and delaying received ultrasonic wave trains which travel in directions other than along said paths, and means for heating the wave director body in the vicinity where the wave director body contacts the test object to eliminate diffraction effects caused by the discontinuities between the wave director body and the test object.

24. A wave director assembly as in claim 23 further including means for cooling portions of the wave director body near the area of contact between the wave director body and the test object to thereby cooperate with the means for heating to form an ultrasonic lens to shape the ultrasonic wave train as it passes between the test object and the wave director assembly body.

25. In an ultrasonic wave director assembly for use in non-destructive testing of an object utilizing ultrasonic wave generator, a body formed of material capable of carrying ultrasonic wave trains, said body having an input surface for receiving the output of an ultrasonic wave generator and an output surface for introducing ultrasonic wave trains into a test object and for receiving ultrasonic wave trains from a test object, the region of said body between the input and output surfaces defining ultrasound paths through said body, said body including portions thereof adjacent said paths for collimating ultrasonic wave trains as they pass along said paths, said body further including portions adjacent said paths for attenuating and delaying received ultrasonic wave trains which travel in directions other than along said paths, and means for heating the wave director body and the test object near the area of contact between the wave director body and the test object primarily along side portions of said area and means for cooling the intermediate portions of said area, to eliminate diffraction effects caused by discontinuities between the body and the test object.

26. In an ultrasonic wave director assembly for non-destructive testing of objects using an ultrasonic transducer, a body formed of material capable of carrying ultrasonic wave trains, said body having an output surface adapted to be placed in ultrasonic communication with the test objection for transmitting and receiving ultrasonic waves therefrom, the body having a curved input surface, said input surface having a radius of curvature intersecting the output surface, the region of said body between the input and output surfaces defining ultrasound paths through said body, said body further including a portion adjacent said paths for attenuating and delaying received ultrasonic wave trains which travel in directions other than along said paths, and a movable transducer holder mounted on said body, said movable transducer holder including a surface in intimate contact with the input surface of said body and including a second surface for receiving ultrasonic wave trains from a transducer, said second surface being spaced apart from said surface in intimate contact with the transmit input surface of the body, means for pivotally mounting said movable transducer holder so that the holder is capable of being moved along the input surface while maintaining intimate contact therewith, power means carried by the body, and means connected to said transducer holder at points lying on a line passing through the area of contact between the transducer holder and the input surface of the body for transmitting forces supplied by said power means to said transducer holder for moving the same.

27. In a wave director assembly for use in the non-destructive testing of objects, a body formed of a material capable of carrying ultrasonic wave trains, the body having one surface adapted to be placed in intimate contact with the object to be tested, said one surface being small in area in comparison to the total surface area of the body, the body having an additional surface spaced from said first named surface, an ultrasonic transducer, a transducer holder mounting said ultrasonic transducer so that ultrasonic wave trains from the transducer are introduced into the additional surface to pass through and out of said one surface, said means for mounting said transducer including a transducer holder in intimate contact with said additional surface, and power means connected to said transducer holder to cause it to be shifted relative to said body, said power means including a pair of arms disposed on opposite sides of the wave director and pivotally secured to the transducer holder at points in line with the area of contact between the transducer holder and the additional surface, and said power means further including a power actuator secured to said body and to said arms for causing relative movement thereof.

References Cited by the Examiner

UNITED STATES PATENTS

| | | | |
|---|---|---|---|
| 2,953,017 | 9/1960 | Bincer | 73—67.8 |
| 2,984,756 | 5/1961 | Bradfield | 73—67.5 X |
| 3,028,751 | 4/1962 | Joy | 73—67.8 |
| 3,159,023 | 12/1964 | Steinbrecher | 73—67.8 |
| 3,168,659 | 2/1965 | Bayre et al. | 73—67.5 X |

FOREIGN PATENTS

| | | |
|---|---|---|
| 853,831 | 10/1952 | Germany. |
| 678,710 | 9/1952 | Great Britain. |
| 703,511 | 2/1954 | Great Britain. |
| 723,112 | 2/1955 | Great Britain. |
| 772,083 | 4/1957 | Great Britain. |
| 120,948 | 1959 | Russia. |

OTHER REFERENCES

Goldman, Richard, Ultrasonic Technology, New York, Rheinhold, 1962. Pages 209–211.

RICHARD C. QUEISSER, *Primary Examiner.*

JOHN P. BEAUCHAMP, *Examiner.*

UNITED STATES PATENT OFFICE
CERTIFICATE OF CORRECTION

Patent No. 3,299,696

January 24, 1967

Ben Wade Oakes Dickinson III

It is hereby certified that error appears in the above numbered patent requiring correction and that the said Letters Patent should read as corrected below.

Column 19, line 53, for the claim reference numeral "5" read -- 1 --.

Signed and sealed this 14th day of November 1967.

(SEAL)
Attest:

Edward M. Fletcher, Jr.
Attesting Officer

EDWARD J. BRENNER
Commissioner of Patents